United States Patent [19]
McClelland

[11] Patent Number: 6,049,078
[45] Date of Patent: *Apr. 11, 2000

[54] TRANSMITTING TIP FOR SCANNING TUNNELING MICROSCOPY SYSTEM

[75] Inventor: Gary Miles McClelland, Palo Alto, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/986,036

[22] Filed: Dec. 5, 1997

[51] Int. Cl.⁷ ................................................. H01J 37/252
[52] U.S. Cl. ........................................... 250/306; 250/305
[58] Field of Search ...................... 250/306, 305

[56] References Cited

U.S. PATENT DOCUMENTS

| | | | |
|---|---|---|---|
| 4,823,004 | 4/1989 | Kaiser et al. | 250/306 |
| 5,278,408 | 1/1994 | Kinoshita et al. | 250/306 |

*Primary Examiner*—Jack Berman
*Attorney, Agent, or Firm*—Gray Cary Ware Freidenrich

[57] ABSTRACT

A ultrathin, hollow, shell-shaped tip for use in a scanning tunneling microscopy system. A bias across a sample and the tip permits electrons tunneling from the surface of the sample to pass through the tip. Several properties of the tunneling electrons may be determined in such a system including the spin orientation, energy, and time dependence, for example. By rastering the sample across the tip, these properties can be imaged across the sample. A high resolution magnetic image of the sample can be generated.

20 Claims, 2 Drawing Sheets

TRANSMITTING TIP FOR SCANNING TUNNELING MICROSCOPY SYSTEM

BACKGROUND OF THE INVENTION

1. Field of the Invention

This invention relates to scanning tunneling microscopy systems, and, more particularly, to tips used in scanning tunneling microscopy systems.

2. Description of the Related Art

Scanning tunneling microscopy ("STM") systems were developed to use electron tunneling for structural and spectroscopic imaging of the surfaces of samples. In practice, electron tunneling occurs when a voltage is placed across two conductors separated by a sufficiently thin insulating layer. In STM systems, the first conductor is the tip of the STM system and the second conductor is the sample whose surface is to be imaged. The insulating layer may be a liquid layer or a vacuum between the STM tip and surface of the sample. The current between the conductors (resulting from the voltage across them and the insulating layer) is a function of the conductor or electrode separation and the nature of the electronic states of the tip and sample.

To perform structural imaging in STM systems, the tunneling current between the tip and sample is measured while scanning the tip across the surface of the sample in, for example, a raster pattern. If the distance between the sample and the tip is adjusted to keep the current constant, a plot of the tip-sample distance versus position of the tip provides an indication of the structure of the surface of the sample. To perform spectroscopic imaging, the position of the tip over the sample is fixed for a period of time while the voltage across the tip and sample is varied. A plot of the deviation of the tunneling current vs. voltage for different positions of the tip enables the spectroscopic imaging of the surface of the sample.

In each of these imaging systems, only the total current of the tunneling electrons is measured in the process of imaging the surface of the sample. The energy or velocity, direction of velocity, and spin orientation of tunneling electrons is not determined. This information, however, could be used to provide higher resolution imaging of the surface or properties of the surface of the sample. Determination of these properties is difficult with conventional STM systems because the tunneling electrons typically scatter after entering the sample. In order to attempt to determine one or more of these properties of tunneling electrons, the simple sharpened metal tips of conventional STM systems have been modified. For example, Packard et al., Europhysics Letters 26, 97 (1994) and Nunes and Amer, Appl. Phys. Lett 63, 1851 (1993), teach the use of semiconductor tips with a narrowly populated band structure to improve spectroscopic resolution.

Johnson and Clarke, J. Appl. Phys 67, 6141 (1990), suggest the use of magnetic tips to accept tuneling electrons with selected spin orientation to enable magnetic imaging of samples. These tips are formed from a single component with material properties carefully selected. Gutierrez et al U.S. Pat. No. 4,985,627 described another STM magnetic imaging technique involving optical excitation of polarized electrons in the tip. Implementing either of these methods is difficult because they require spin discrimination or spin selection in the tip itself. Structured tips for improved spectroscope imaging have also been suggested. Dykhne et al., Physics Doklady 41, 233 (1996) and Hauser et al., Superlattices and Microstructures 20. 623 (1996) suggest the use of a quantum dot tip. U.S. Pat. No. 5,581,083, suggests the use of a Schottky barrier tip. E. L. Courtens et al, IBM Technical Disclosure Bulletin Vol. 35, No. 3 describe the use of a hollow tip with a thin membrane. Each of these suggested structured tips, however, still only measures the total tunneling current, which is a function of the potential at the tip. In addition, with these tips energy spectra can not be measured without changing the sample-tip bias. The need exists for a tip structure which permits measurement of the tunneling electron energy and/or angular distribution independent of the sample bias. W. J. Kaiser and D. Bell, U.S. Pat. No. 4,823,004 describe a STM geometry employing an ultra-thin sample which transmits tunneling electrons, allowing the angle and energy of the transmitted electrons to be measured. However this method is not generally applicable, requiring the use of very specially prepared samples. In addition, a need exists for tip which enables higher resolution magnetic imaging of the surface or surface properties of a sample, i.e., imaging in the nanometer or sub-nanometer range by a method in which the electron spin discrimination is performed remotely from the tip.

SUMMARY OF THE INVENTION

The present invention is an ultrathin tip used in scanning tunneling microscopy systems. The tip has an outer section and an inner section that is surrounded by the outer section. The thickness of the inner section is small enough to permit electrons to pass through it. The outer section is thick enough to provide functional rigidity to the tip and to mount the tip.

In one embodiment, the inner section is about 50 to 300 angstroms thick. In another, the thickness of the inner section is small enough that the transmission probability of electrons impinging upon the inner section is at least 12.0 percent. The tip may primarily consist of gold. In addition, a back side of the inner section of the tip where electrons exit may be coated with cesium or another substance to reduce the workfunction of the back side. In such a case, the workfunction of the back side of the inner section is ideally about 2.0 volts.

In another embodiment, the tip is generally disc shaped, and the outer section is an annulus that surrounds the inner section. The inner section of the tip has an inner segment and an outer segment, the outer segment having a thickness and the inner segment having a thickness much less than the thickness of the outer segment. In this embodiment, the thickness at the outer section transitions through the outer segment of the inner section to the thickness of the inner segment. In this regard, the outer section may be about 25 micrometers thick. The inner segment of the inner section may be about 50 to 300 Angstroms thick.

Another embodiment of the invention is a scanning tunneling microscopy system capable of determining properties of electrons emitted from a sample to be analyzed. This system includes an ultrathin tip having a front side and back side where the front side is directed towards and is in close proximity to the sample. The system also includes a control unit electrically connected to the ultrathin tip and to the sample. The control unit provides a voltage across the tip and sample so the sample is negatively biased with respect to the tip, and some electrons emitted from the surface of the sample have enough energy to tunnel through an insulating barrier between the sample and the tip and overcome the workfunction of the back side of the tip. This permits some electrons emitted from the surface of the sample to pass through the tip.

This embodiment may further include an electron analyzer/detector connected to the tip by a vacuum. Tunneled electrons passing through the tip are collected and analyzed by the electron analyzer/detector. The analyzer/detector embodiment may include a means to measure the energy distribution of these electrons and it may be coupled to an imager to measure the angular distribution of these electrons. In this embodiment, the electron analyzer/detector may include a Mott detector, electron diffraction detector, foil transmission detector, or other means for measuring the spin orientation of collected electrons. In this case, the imager may generate magnetic images based on the output of the Mott detector and the electron diffraction detector. Finally, the electron analyzer/detector may employ a sweeping method to determine the temporal variation of the current of the collected electrons.

DETAILED DESCRIPTION OF THE PREFERRED EMBODIMENTS

Figure 1:
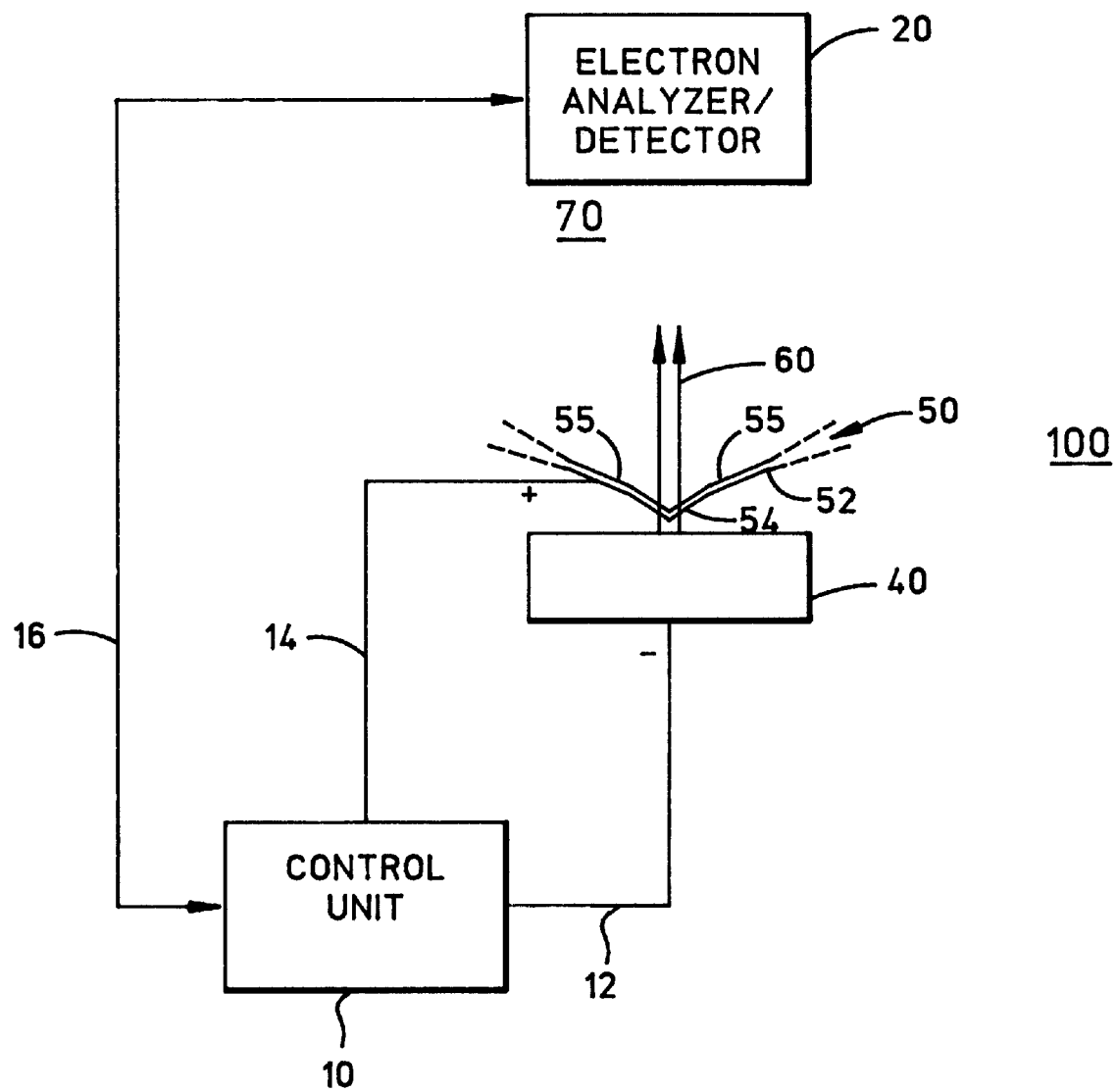
FIG. 1 is a block diagram of a novel STM system employing a hollow tip according to the present invention.
Figure 2A:
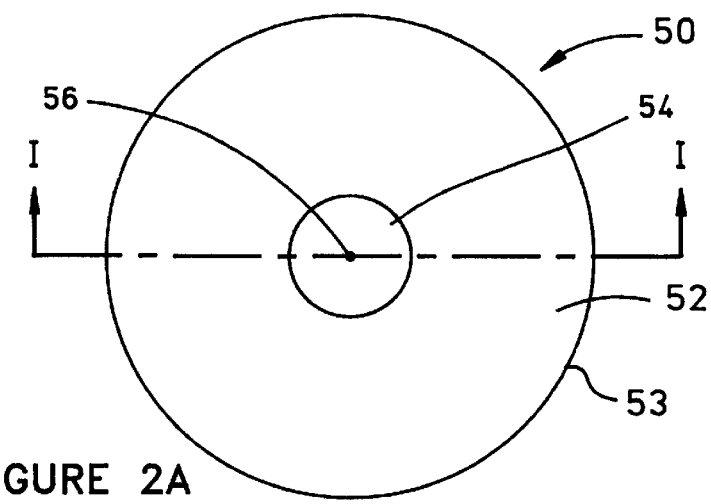
FIG. 2A is a magnified, top plan diagram of a hollow tip for use in a STM system according to the present invention.
Figure 2B:
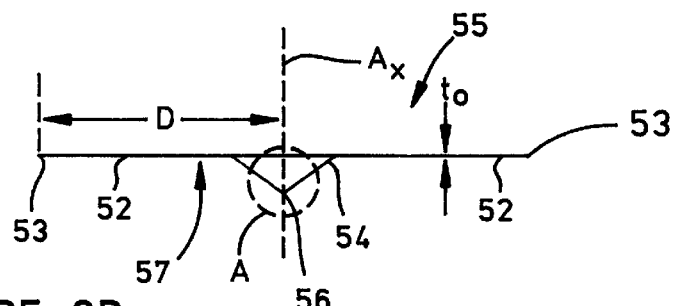
FIG. 2B is a side section taken along I—I in FIG. 2A.
Figure 2C:
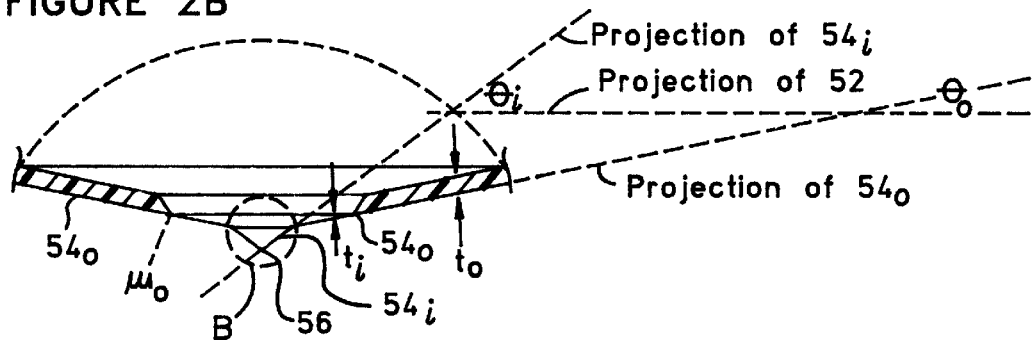
FIG. 2C is a diagram representing magnification of section A of the tip shown in FIG. 2B.

A preferred embodiment of the invention is presented with reference to FIGS. 1–2C. FIG. 1 is a simplified diagram of an STM system 100 employing a ultrathin, hollow tip according to the present invention. FIGS. 2A–2D are diagrams of an ultrathin, hollow tip for use in a STM system (including system 100) according to the present invention.

The SIM system 100 shown in FIG. 1 includes a control unit 10, electron analyzer/detector 20, a sample to be analyzed 40, and a tip 50. The electron analyzer/detector 20 and control unit 10 communicate via a control bus 16. Unlike conventional tips, the tip 50 of the first embodiment of the present invention is a ultrathin, hollow, shell-shaped tip. In this system, the control unit 10 has electrical connections to the tip 50 via line 14 and the base of the sample 40 via line 12. The control unit places a voltage across the tip 50 and the sample 40 via lines 14 and 12 to negatively bias the sample. The voltage across the tip and sample is set to a level great enough to generate tunneling electrons 60 having an energy level sufficient to overcome the workfunction of the back side of the distal end 52 of the tip 50.

When the sample 40 is so biased, electrons 60 can tunnel from the negatively biased sample 40, through the distal end 52 of the tip 50, into a vacuum 70 behind the back side of the distal end 52 of the tip 50. The vacuum 70 is established between the back side of the tip 50 and electron analyzer/detector 20. The vacuum 70 enables the tunneling electrons 60 which pass through the tip 50 to travel to the analyzer/detector 20 with little dissipation of energy, spin, or deviation of direction.

The electron analyzer/detector 20 collects the tunneling electrons 60 which pass from the tip 50 through the vacuum 70.

The electron analyzer/detector 20 may measure the orientation of the spins of the transmitted tunneling electrons 60, the energy of the electrons 60, the time dependence of the electrons 60, or the angular distribution of the electrons leaving the tip 50. The analyzer/detector may use the information about the variation in orientation of the spins transmitted as the sample is scanned to produce high resolution magnetic images. Further, the analyzer/detector may use information about the energy and time dependence of the electrons to produce high resolution spectroscopy including vibrational spectroscopy sample adsorbates and surface dynamics of the sample 40. Low noise detection is possible because the electron analyzer/detector 20 of the STM system 100 with the tip 50 is not limited by thermal noise in the detector and, thus, has much greater sensitivity than conventional STM systems. This is primarily due to the hollow tip 50 of the invention and efficiency of detection in the electron analyzer/detector 20.

The control unit 10 and electron analyzer/detector 20 work together via control bus 16 to determine surface structure or surface properties of segments of the sample 40. The control unit 10 may move the position of the sample via a piezoelectric tripod, multisectioned piezoelectric scanner, or other means that are known in the art. G. Binnig and H. Rohrer, in IBM J. Res. Develop., Vol. 30, No. 4, July 1986, 355–369, teach STM systems and positioning techniques; their work is incorporated by reference for its teachings in this regard. The control unit 10 scans the position of the sample 40 while the analyzer/detector 20 measures properties of the electrons 60. This permits the analyzer/detector 20 to plot different properties of the electrons as a function of the position of the sample 40, i.e., to generate an image of the structure or properties of the surface of the sample 40. In particular, the spin polarization of the transmitted electrons can be measured as a function of the position of the sample 40, thus yielding an image of the magnetization of the sample electrons at the Fermi level as a function of position.

Referring to FIGS. 2A and 2B, the tip 50 of this invention is a disc-shaped membrane having a hollow tip structure that is ultrathin. The tip 50 may generally have approximately cylindrical symmetry about a tip axis $A_x$, but parts of the tip may deviate by having pyramidal symmetry about $A_x$, for example. An outer section 52 of the tip 50 provides structural stability for an inner section (also distal end) 54 of the tip 50, and provides a means to mount the tip. As a consequence, the outer section 52 is many times thicker than this inner section 54. The inner section 54, especially towards the tip axis $A_x$, is kept ultrathin so that tunneled electrons 60 can easily pass through it for collection in the electron analyzer/detector 20. The structure of the tip 50 with the two sections 52 and 54 is presented with reference to FIGS. 2A–2D, which are not to scale.

The tip 50 is shown in plan in FIG. 2A and in side section in FIG. 2B, which is taken along I—I in FIG. 2A. The tip 50 is a membrane formed of conductive material, and it has an outer portion 52 that substantially surrounds an inner portion 54. The outer portion 52 has an outer edge 53 that forms an outer edge of the tip 50. The inner portion 54 forms a tip structure that tapers to an apex 56. A tip axis $A_x$ extends through the apex 56 of the tip structure in the inner section 54. The tip has a back surface 55 that faces the analyzer detector 20 and a front surface 57 that faces the sample 40. The membrane has a varying thickness, in which an outer thickness ($t_o$) of the outer portion transitions to an inner thickness ($t_i$) within the inner portion 54, with $t_o \gg t_i$. Further, $t_i$ has a varying thickness, in which a transition thickness ($t_{tr}$) transitions from $t_o$ to a tip thickness ($t_{tp}$), with $t_o > t_{tr} > t_{tp}$. Further, the tip structure in the inner section 54 may be characterized by a pyramidal or conical shape that is substantially symmetrical about the tip axis $A_x$ and in which an outer segment $54_o$ of the inner section 54 forms an outer angle $\theta_o$ with the outer portion 52 and an inner segment $54_i$ forms an inner angle $\theta_i$ with the outer portion 52, with $90°>\theta_i>\theta_o$. Preferably, the membrane is substantially disc-like, having a substantially circular symmetry about the tip axis $A_x$. The outer section 52 is, preferably, an annulus that surrounds the inner section 54.

Figure 2D:
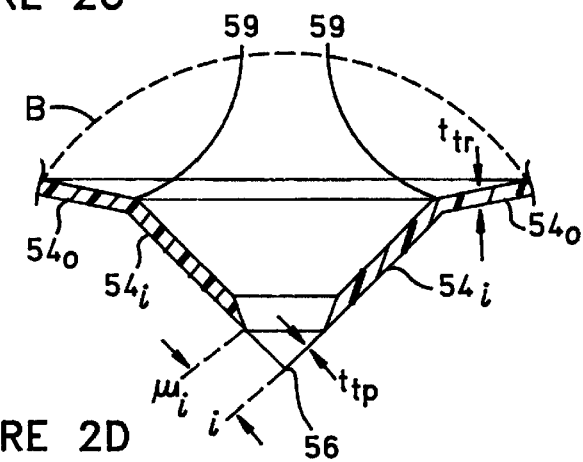
FIG. 2D is a diagram representing magnification of section B of section A of the tip shown in FIG. 2C.

The tip 50 preferably is formed primarily of gold. Gold is electrically conductive. Gold produces low levels of electron scattering, and is chemically inert so that a thin tip made of gold should be robust. The gold may be coated on the back side 55 of the tip 50 (facing the electron analyzer/detector 20) with a monolayer of Cs (cesium) or other material to reduce the workfunction of the tip to about 2.0 Volts. Then, the sample 40 may be held at lower bias, reducing the electron scattering. As shown in FIG. 2D, the thickness $t_{tp}$ of the inner segment $54_i$ is preferably only 30 to 300 angstroms, and the width ($w_i$) of the inner segment $54_i$ is about one micrometer on each side. Electrons with energy greater than 2.0 V (enough to overcome the workfunction) would have an attenuation length of about 140 angstroms. When the thickness $t_{tp}$ is 300 angstroms, the transmission probability of the electrons through gold is about 12.0%.

One consideration with an ultrathin inner section 54 is that the tip 50 must be rigid overall. The attractive force derivative between the tip 50 and sample 40 for a STM system 100 is on the order of 30 Newton/meter (N/m). Thus, the spring constant of the tip must be greater than 30 N/m. As a consequence, the width ($w_i$) of the inner segment $54_i$, that must be kept small (~1 micrometer). However, the tip 50 must also protrude a significant distance from any support to permit access to the sample. The tip 50 meets these requirements. The overall diameter (D) of the tip 50 is 2.5 mm. The outer segment $54_o$ has a thin section near the inner segment $54_i$. The thickness ($t_{tr}$) of this section is about one micrometer, while its width ($w_o$) is about 100 micrometers. The thickness $t_o$ of the remaining portion of the outer segment $54_o$ extending away from the inner segment $54_i$ is about 25 micrometers. This thickness extends out to the outer edge 53. A method of fabricating such a tip by depositing gold on an indented copper substrate is next presented.

First, a tip structure is generated in a copper substrate by a) producing a deep indent with a flat bottom in the substrate; and b) producing a smaller indent in the flat bottom of the deep indent of the substrate. The deep indent comprises the outer segment $54_o$ of the inner section 54, while the smaller indent comprises the inner segment $54_i$. Next, 300 angstroms of gold is deposited onto the substrate by evaporation. An additional one micrometer of gold is evaporation deposited onto the substrate at several azimuthal angles so the bottom of the tip structure, extending from the apex 56, is shadowed by the edge 59 of the small indent. The small indent is characterized by a gap ($w_i$) of ~ one micrometer wide on each side as shown in FIG. 2C, where the second layer is not deposited in the tip. Additionally, 25 micrometers of gold is deposited on the tip by electroplating, protecting the center 200 micrometers of the tip 50 by a resist, producing the results shown in FIG. 2D. Finally. the copper substrate is etched away, leaving the tip shown in FIGS. 2A–2D. As noted above. a layer of Cs may be deposited in vacuum on the back side 55 of the tip 50 to reduce the workfunction of the tip 50 at this location.

As noted above, the tip of the present invention enables determination of properties of tunneling electrons rather than just the total current as in current STM systems and with conventional tips. For example, the electron analyzer/detector 20 could include a Mott detector for measuring the spin polarization of tunneling electrons 60. A Mott detector is described in by T. J. Gay and F. B. Dunning in Rev. Sci. Instru. 63, 1635 (1992) which is incorporated by reference for its teachings on Mott detectors. The spin polarization information may be recorded as the sample is scanned and passed to an imager to generate high resolution, magnetic images of the surface of the sample 40. It is noted that the polarization of the tunneling electrons 60 correlates with the magnetization of the sample's electrons at the Fermi level, i.e., those electrons which extend out from the sample 40. Such a STM system 100 with tip 50 could produce magnetic images at the sub nanometer resolution in about 1 minute for a Mott detector efficiency as low as $2\times10^{-5}$.

The speed of magnetic imaging could be improved 200 fold by using, instead of a Mott detector, an electron diffraction detector described by D. Willman, R- Thiel, and K. Kisker in Z. Phys B 77, 1 (1989) or a transmission detector described by Avan der. Sluijs, H-J. Drouhin, G. Lampel, Y. Lassailly, and C. Marliere, C.R. Acad. Sci. Paris, t. 319, Series II, p. 754–759 (1994). These papers are incorporated by reference for their teachings on spin detectors. A system employing a Mott, electron diffraction, or transmission spin detector in the detector/analyzer 20 could be used in many high resolution magnetic imaging applications, for example to aid the development of magnetic heads, magnetic random access memory, and magnetic media.

As also noted above, the STM system 100 and tip 50 could also be used to measure tunneling electron 60 energy distributions. In such an application, the inner section 54 of the tip should be reduced in thickness to about 50 angstroms to minimize energy loss in the tip. Such a tip 50 and system 100 would enable the characterization of energy levels at the tunneling interface of the sample. One characterization of energy levels could be the vibrational levels of adsorbed molecules. Further, the system 100 and tip 50 could be used to record the temporal variation of the current transmitted by the tunneling electrons 60.

In detail, the temporal variation of the current could be recorded by employing a sweeping method in the electron analyzer/detector. Such sweeping methods have been used previously for field emitted beams. Employing this method, the electron analyzer/detector 20 could focus and sweep a transmitted beam of tunneling electrons 60 across a detector screen. This would enable the determination of the temporal variation of the current transmitted by the tunneling electrons 60, which would enable the instrument to achieve sub-picosecond time resolution. Suitable sweeping methods are described by H. Heinzelmann, F. Watanabe, and G. M. McClelland in Phys. Rev. Lett. 70, 3611 (1993) and by G. M. McClelland in U.S. Pat. No. 5,151,594, both of which are incorporated by reference for teachings on sweeping methods Thus, the ultrathin, hollow, shell-shaped tip of the present invention enables to the determination of many properties of the tunneling electrons 60. This, in turn, enables the determination of many properties or structure of the surface of a sample 40. Other variations on the electron analyzer/detector 20 are possible to measure or image additional properties of the tunneling electrons 60. In addition, different materials may be used to form the tip according the present invention.

I claim:

1. A tip for use in a scanning tunneling microscopy system, the tip comprising:

an outer section; and an inner section surrounded by the outer section;

the inner section having a first thickness that permits electrons to pass through; and the outer section having a second thickness to provide functional rigidity to the tip;

the second thickness being substantially greater than the first thickness.

2. The tip according to claim 1 where the first thickness is about 50 to 300 angstroms.

3. The tip according to claim 1 where a transmission probability of electrons impinging upon the inner section is at least twelve percent.

4. The tip according to claim 1 where the tip consists primarily of gold.

5. The tip according to claim 1, the inner section of the tip including a back side coated with cesium.

6. The tip according to claim 5 wherein the workfunction of the back side of the inner section of the tip is about 2.0 volts.

7. A tip for use in a scanning tunneling microscopy system, the tip comprising:

an outer section having an outer thickness ($t_o$); and an inner section with an outer region that abuts the outer section and an inner region having a tip thickness ($t_{tp}$) small enough to support passage of electrons there through;

where $t_o >> t_{tp}$.

8. A tip with an apex for use in a scanning tunneling microscopy system, the tip comprising:

an outer section having a thickness ($t_o$);

an inner section surrounded and supported by the outer section;

an outer region of the inner section that abuts the outer section, the outer region having the thickness $t_o$ near the outer region, and having a thickness $t_{tr}$ away from the outer section, toward the apex; and an inner region of the inner section that abuts the outer region, the inner region including the apex and having the thickness $t_{tr}$ near the outer region, and having a thickness $t_{tp}$ away from the outer region, toward the apex;

where $t_o > t_{tr} > t_{tp}$.

9. A scanning tunneling microscopy system capable of determining properties of tunneling electrons emitted from a sample to be analyzed, the system comprising:

an ultrathin tip having a front side and a back side, the front side directed towards and in close proximity to the sample; and a control unit electrically connected to the ultrathin tip and sample, the control unit providing a voltage across the tip and sample so the sample is negatively biased and electrons emitted from the surface of the sample have enough energy to overcome a workfunction of the back side of the tip, whereby electrons tunneling from the surface of the sample pass through the tip.

10. The scanning tunneling microscopy system according to claim 9, further comprising an electron analyzer/detector connected to the tip by a vacuum, wherein tunneling electrons passing through the tip are collected and analyzed and detected by the electron analyzer/detector.

11. The scanning tunneling microscopy system according to claim 10, in which the control unit scans the sample to produce images of properties of electrons collected and analyzed by the electron analyzer/detector.

12. The scanning tunneling microscopy system according to claim 11, wherein the electron analyzer/detector includes a Mott detector for measuring the spin orientation of collected electrons.

13. The scanning tunneling microscopy system according to claim 11, wherein the electron analyzer/detector includes an electron diffraction detector or a transmission detector for measuring the spin orientation of collected electrons.

14. The scanning tunneling microscopy system according to claim 10, wherein the electron analyzer/detector employs a sweeping method to determine the temporal variation of the current of the collected electrons.

15. The scanning tunneling microscopy system according to claim 10, wherein the tip includes:

an outer section;

an inner section surrounded and supported by the outer section;

the inner section having a thickness adapted to permit electrons to pass through; and the outer section having a thickness adapted to support the tip.

16. The scanning tunneling microscopy system according to claim 10, wherein the tip includes:

an inner section having an inner region and an outer region, the outer region having a thickness and the inner region having a thickness less than the thickness of the outer region;

the thickness of the inner region being small enough to permit electrons to pass through.

17. The scanning tunneling microscopy system according to claim 15, wherein the tip has a center in the inner section which is about 50 to 300 angstroms thick.

18. The scanning tunneling microscopy system according to claim 15, wherein the inner section has a back side coated with cesium.

19. The scanning tunneling microscopy system according to claim 9, wherein the inner section includes a back side coated with a material for lowering the workfunction of the tip at the back side.

20. A scanning tunneling microscopy system capable of determining properties of tunneling electrons emitted from a sample to be analyzed, the system comprising:

an ultrathin tip including:

a front side, the front side directed towards and in close proximity to the sample;

a back side;

an outer section; and an inner section surrounded and supported by the outer section and having a center region having a thickness small enough to permit electrons to pass through;

a control unit electrically connected to the ultrathin tip and sample, the control unit providing a voltage across the tip and sample so the sample is negatively biased with respect to the tip and electrons emitted from the surface of the sample have enough energy to overcome a workfunction of the back side of the tip; and an electron analyzer/detector connected to the tip by a vacuum;

wherein electrons tunneling from the surface of the sample pass through the tip and are collected and analyzed by the electron analyzer/detector.

* * * * *